(12) United States Patent
Suzuki

(10) Patent No.: US 6,902,788 B2
(45) Date of Patent: Jun. 7, 2005

(54) INSULATION FIBER BASED HEAT-INSULATING STRUCTURE

(75) Inventor: Norio Suzuki, Yokohama (JP)

(73) Assignee: Hikari Toshi Sougou Sekkei, Tokyo (JP)

( * ) Notice: Subject to any disclaimer, the term of this patent is extended or adjusted under 35 U.S.C. 154(b) by 13 days.

(21) Appl. No.: 10/201,984

(22) Filed: Jul. 25, 2002

(65) Prior Publication Data

US 2003/0021937 A1 Jan. 30, 2003

(30) Foreign Application Priority Data

Jul. 25, 2001 (JP) ........................................ 2001-256990
Apr. 23, 2002 (JP) ........................................ 2002-156456

(51) Int. Cl.[7] ................................................ B32B 5/26
(52) U.S. Cl. ............................ 428/55; 428/54; 428/74; 428/76; 52/406.2; 52/404.3
(58) Field of Search .............................. 428/54, 55, 74, 428/76, 119; 52/406.1, 406.2, 404.3, 404.4

(56) References Cited

U.S. PATENT DOCUMENTS 4,300,322 A * 11/1981 Clark ........................ 52/406.1
5,169,700 A * 12/1992 Meier et al. ................... 428/74
5,776,580 A * 7/1998 Rasmussen et al. .......... 428/74
6,141,930 A * 11/2000 Allwein et al. ............ 52/406.1

* cited by examiner

Primary Examiner—Alexander S. Thomas
(74) Attorney, Agent, or Firm—Westerman, Hattori, Daniels & Adrian, LLP

(57) ABSTRACT

The present invention provides a heat-insulating structure using a fluff-like heat-insulating material such as cellulose insulation fibers, capable of allowing convenient handling and preventing a so-called settling-down phenomenon in which the top of the heat-insulating material will settle down with time. The heat-insulating structure comprises a plurality of strap-shaped partition members 2 arranged to define an array of heat-insulating segments therebetween, and cellulose insulation fibers filled in each of the heat-insulating segments. A surface member 3 such as an underlying member or a facing member may be adhesively attached to the exposed surface of the interleaved structure of the partition members and the heat-insulating segments filled with the cellulose insulation fibers to provide a discrete heat-insulating panel.

11 Claims, 1 Drawing Sheet

INSULATION FIBER BASED HEAT-INSULATING STRUCTURE

FIELD OF THE INVENTION

The present invention relates to a heat-insulating structure including a plurality of strap-shaped partition members and an array of heat-insulating segments filled with insulation fibers or the like, in an interleaved arrangement.

BACKGROUND OF THE INVENTION

Cellulose insulation fibers are commonly used as insulation fibers and these are defined, for example, in Japanese Industrial Standards (JIS) A-9523:2001. Cellulose insulation fibers are fluff-like material obtained by cracking a raw material, such as used newspapers or corrugated boards, and then processing the cracked material through a fibrillator. The cellulose insulation fibers have excellent heat-insulation and sound-absorption properties because of millions of air chambers in each fiber itself and air contained between intertangled fibers. For the purpose of using as a building material, there has heretofore been known a dry blowing method in which the cellulose insulation fibers are blown directly onto the inner surface of the roof or the wall surface of a building to form a deposit of the cellulose insulation fibers.

However, the cellulose insulation fiber deposit formed through the dry blowing method is be undesirably involved in a so-called settling-down phenomenon in which the top of the deposit will settle down with time, and the height of the deposit can be eventually reduced by about 15 to 20% of its initial height. In particular, if cellulose insulation fibers are deposited on a vertical wall surface through the dry blowing method, the settling-down becomes obvious to cause a gap between the top of the deposit and the building structure initially in contact with the deposit, resulting in significantly deteriorated heat-insulation, anti-condensation and sound-insulation performances. Further, existing celluros fibers can be actually handled only by specialized agencies, because the celluros fibers are formed in a sort of fluffs and thereby it is inconveniently required to surround the work environment with an anti-scattering cover such as a plastic sheet during the blowing operation of cellulose insulation fibers on a vertical surface of a wall or the like.

SUMMARY OF THE INVENTION

It is therefore an object of the present invention to provide a heat-insurating structure using a fluff-like heat-insulating material such as cellulose insulation fibers, capable of preventing the settling-down phenomenon and allowing everyone to conveniently handle and install even onto a vertical surface without any difficulty.

In order to the above object, according to the present invention, there is provided a heat-insulating structure comprising a fluff-like heat-insulating material such as cellulose insulation fibers, and a plurality of strap-shaped partition members partitioning the heat-insulating material into an array of heat-insulating segments.

The present invention also provides a discrete heat-insulating panel comprising a surface member such as a facing member arranged to cover or be attached to at least the exposed surface, such as front and back surfaces and upper and lower sides, of the above heat-insulating structure or the interleaved structure of the partition members and the heat-insulating segments filled with the heat-insulating material.

In a specific embodiment, a heat-insulating structure of the present invention may be constructed as following,
(1) A plurality of strap-shaped partition members are arranged substantially in parallel with each other to define an array of heat-insulating segments therebetween. Then, a fluff-like heat-insulating material such as cellulose insulation fibers is filled in each of the heat-insulating segments, or
(2) A surface member is attached to the exposed surface, such as the front and back surfaces and the upper and lower sides, of the above structure or the interleaved structure of the partition members and the heat-insulating segments filled with the heat-insulating material to provide a discrete heat-insulating panel having any dimensions.

For example, the above heat-insulating structure is placed between inner and outer walls of a building without any space therebetween. The heat-insulating structure may be used in the form of a plurality of divided pieces according to need.

In a preferred embodiment, each of the strap-shaped partition members may have any suitable thickness, and may be made of, but not limited to, a paper-based material.

The surface member may be a facing member as well as an underlying or lathing member.

Further, in the heat-insulating panel using cellulose insulation fibers as the fluff-like heating material, the strap-shaped partition members and the surface member may be formed of a reusable or recyclable paper-based material, and the surface member may be attached to the exposed surface with water-soluble paste. In this case, the entire heat-insulating panel can be reused or recycled because the cellulose insulation fibers are also reused or recycled.

The fluff-like heat-insulating material is not limited to cellulose insulation fibers, and any other suitable fluff-like heat-insulating material may be used as a substitute for or in combination with cellulose insulation fibers. Further, each of the strap-shaped partition members may be composed of at least two strap-shaped members superimposed on each other.

DESCRIPTION OF THE PREFERRED EMBODIMENT

Figure 1:
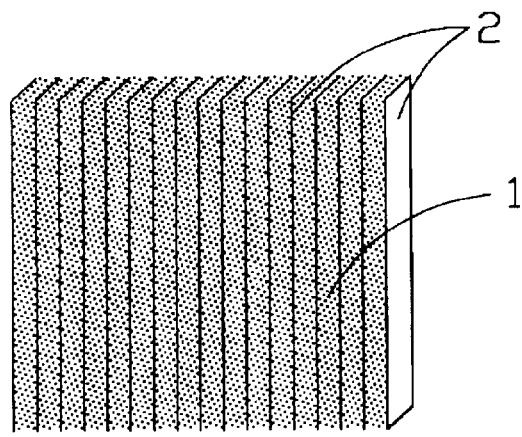
FIG. 1 is a perspective view of a heat-insulating structure according to one embodiment of the present invention.

With reference to the drawings, preferred embodiment of the present invention will now be described. In one embodiment as shown in FIG. 1, a heat-insulation structure comprises a fluff-like heat-insulating material of cellulose insulation fibers 1, and a plurality of strap-shaped partition members 2 partitioning the cellulose insulation fibers into an array of heat-insulating segments. Preferably, the strap-shaped partition members 2 can be arranged substantially in parallel with each other along the width direction of the structure to define the array of heat-insulating segments therebetween, and each of the partition members 2 can extend approximately throughout the thickness and height of the structure. Further, each of both lateral sides of the structure may be defined by one of the partition members disposed on the outermost sides in the width direction.

The fluff-like heat-insulating material is not limited to cellulose insulation fibers, and any other suitable fluff-like heat-insulating material may be used as a substitute for or in combination with cellulose insulation fibers.

Each of the partition members is made of, but not limited to, a paper-based material, and may have any suitable thickness.

Figure 2:
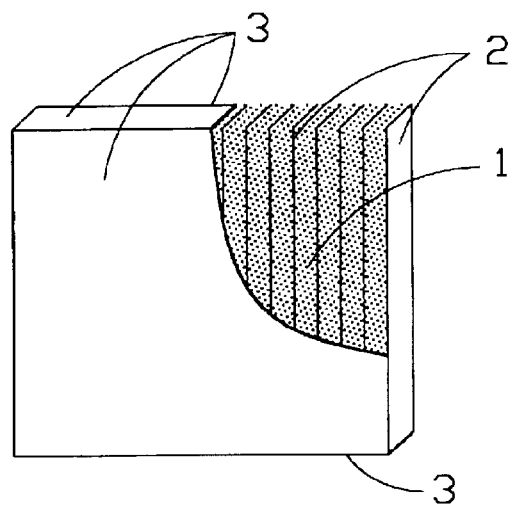
FIG. 2 is a partially cut-off perspective view of a panel-type heat-insulating structure according to another embodiment of the present invention.

FIG. 2 shows another embodiment in which a surface member 3 is adhesively attached to the exposed surface, or the front and back surfaces and the upper and lower sides, of the heat-insulating structure as shown in FIG. 1 to provide a discrete heat-insulating panel. The surface member is made of, but not limited to, a paper-based material. Further, the surface member may be an underlying or lathing member or a facing member depending on the application of the panel.

Further, in the heat-insulating panel as shown in FIG. 2, the strap-shaped partition members 2 and the surface member 3 may be formed of a reusable or recyclable paper-based material, and the surface member 3 may be attached to the exposed surface with water-soluble paste. In this manner, the entire heat-insulating panel can be reused or recycled because the cellulose insulation fibers are also reused or recycled.

Figure 3:
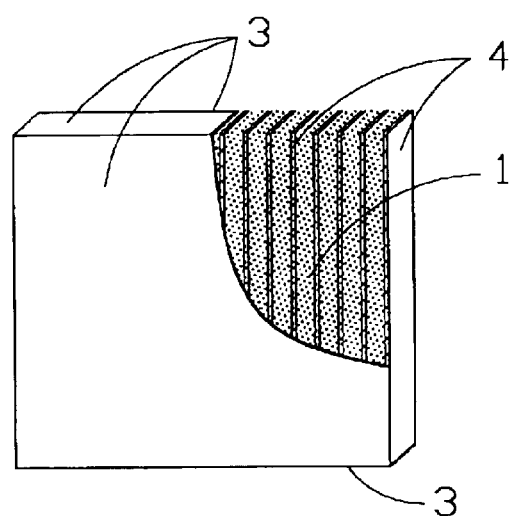
FIG. 3 is a partially cut-off perspective view of a panel-type heat-insulating structure according to still another embodiment of the present invention.

When the heat-insulating panel as shown in FIG. 2 is cut into right and left portions along a plain in parallel with one of the strap-shaped partition members 2, at least one of the right and left portions has a cut surface with exposed cellulose insulation fibers, and thereby the cellulose insulation fibers can undesirably get out of the cut surface. FIG. 3 shows another embodiment to prevent this disadvantage. In this heat-insulating panel, the fluff-like heat-insulating material of cellulose insulation fibers 1 is partitioned by a plurality of strap-shaped partition members 4 each composed of a pair of strap-shaped members superimposed on one another. The heat-insulating panel can be cut into right and left portions by separating the pair of strap-shaped members in such manner that the superimposed surfaces thereof define the respective cut surfaces of the right and left portions. This can prevent any cellulose insulation fibers from getting out of the cut surfaces. In this embodiment, it is understood that three or more of strap-shaped members may be superimposed on each other. Further, if each of the partition members 2 is composed of a single strap-shaped member which has a sufficient thickness allowing the single strap-shaped member to be mechanically cut into two pieces, the two pieces can define the respective cut surfaces of the right and left portions to obtain the same benefit as described above.

According to the heat-insulating structure of the present invention, cellulose insulation fibers are sandwiched and held reliably by the plurality of strap-shaped partition members. This can desirably suppress the settling-down caused in the conventional heat-insulating structure having no partition members, or the gap otherwise caused at the upper portion of the heat-insulating structure. Thus, desirable heat-insulating property can be maintained over long periods.

A heat-insulating panel can also be provided by covering the heat-insulating structure with a surface member. This can eliminate the need for using a blowing machine at work site. Further, the heat-insulating panel can be conveniently handled and installed even in a vertical wall.

Further, by using cellulose insulation fibers as the heat-insulating material, forming the strap-shaped partition members and the surface member by a reusable or recyclable paper-based material, and attaching the surface member to the exposed surface with water-soluble paste, an entirely reused or recycled heat-insulating panel can be effectively achieved.

Furthermore, the heat-insulating panel can be cut into right and left portions without any exposure of the cellulose insulation fibers by using at least two superimposed strap-shaped members as each of the plurality of strap-shaped partition members and separating the superimposed strap-shaped members in such manner that the superimposed surfaces thereof define the respective right and left cut surfaces of the heat-insulating panel. This can prevent any cellulose insulation fibers from getting out of the cut surfaces.

What is claimed is:

1. A heat-insulating structure including two major surfaces, comprising:

a plurality of planar strap-shaped partition members arranged substantially in parallel with each other to define an array of heat-insulating segments therebetween; and heat-insulating fiber material filled in each of said heat-insulating segments to be positioned adjacent to but not encapsulated by said planar strap-shaped partition members, wherein said planar strap-shaped partition members are arranged substantially vertically to said major surfaces, a surface member covering at least one said major surfaces, and wherein said partition members and said surface member are formed of a paper-based material, and said surface member is attached to an interleaved structure of said partition members and said heat-insulating fiber material with water-soluble paste.

2. A heat-insulating panel as defined in claim 1, wherein each of said partition members comprises at least two strap-shaped members superimposed on each other.

3. A heat-insulating structure as defined in claim 1, wherein said heat-insulating fiber material is formed of cellulose insulation fibers.

4. A heat-insulating panel having two major surfaces, comprising:

a plurality of planar strap-shaped partition members arranged substantially in parallel with each other to define an array of heat-insulating segments therebetween;

heat-insulating fiber material filled in each of said heat-insulating segments to be positioned adjacent to but not encapsulated by said planar strap-shaped partition members; and a surface member covering at least the exposed surface of an interleaved structure of said partition members and said heat-insulating segments filled with said heat-insulating material, wherein said planar strap-shaped partition members are arranged substantially vertically to said major surfaces, wherein said partition members and said surface member are formed of a paper-based material, and said surface member is attached to said interleaved structure with water-soluble paste.

5. A heat-insulating panel as defined in claim 4, wherein said surface member includes a facing member.

6. A heat-insulating panel as defined in claim 4, wherein each of said partition members comprises at least two strap-shaped members superimposed on each other.

7. A heat-insulating panel as defined in claim 4, wherein said heat-insulating fiber material is formed of cellulose insulation fibers.

8. A heat-insulating panel having two major surfaces, comprising:
- a plurality of planar strap-shaped partition members each disposed between and vertical to said two major surfaces of said panel, said partition members arranged substantially in parallel with each other defining an array of heat-insulating segments therebetween;
- heat-insulating fiber material filled in each of said heat-insulating segments to be positioned adjacent to but not encapsulated by said planar strap-shaped partition members; and
- a surface member covering at least said major two surfaces, wherein said partition members and said surface member are formed of a paper-based material, and said surface member is attached to an interleaved structure of said partition members and said heat-insulating fiber material with water-soluble paste.

9. A heat-insulating panel as defined in claim 8, wherein said surface member includes a facing member.

10. A heat-insulating panel as defined in claim 8, wherein each of said partition members comprises at least two strap-shaped members superimposed on each other.

11. A heat-insulating panel as defined in claim 8, wherein said heat-insulating fiber material is formed of cellulose insulation fibers.

* * * * *